US007764225B2

(12) United States Patent
Syrjarinne et al.

(10) Patent No.: US 7,764,225 B2
(45) Date of Patent: Jul. 27, 2010

(54) PROVIDING AND USING MESSAGES INCLUDING TIME RELATED INFORMATION

(75) Inventors: Jari Syrjarinne, Tampere (FI); Ismo Halivaara, Tampere (FI)

(73) Assignee: Nokia Corporation, Espoo (FI)

( * ) Notice: Subject to any disclaimer, the term of this patent is extended or adjusted under 35 U.S.C. 154(b) by 236 days.

(21) Appl. No.: 11/978,212

(22) Filed: Oct. 26, 2007

(65) Prior Publication Data

US 2008/0117102 A1   May 22, 2008

Related U.S. Application Data

(63) Continuation-in-part of application No. 11/588,838, filed on Oct. 27, 2006.

(60) Provisional application No. 60/879,952, filed on Jan. 10, 2007.

(51) Int. Cl.
G01S 19/33 (2010.01)
G01S 19/05 (2010.01)
G01S 19/25 (2010.01)

(52) U.S. Cl. .................................. 342/357.09
(58) Field of Classification Search ............ 342/357.09, 342/357.1, 357.14
See application file for complete search history.

(56) References Cited

U.S. PATENT DOCUMENTS 5,631,949 A * 5/1997 Milton et al. ............... 379/88.2

FOREIGN PATENT DOCUMENTS

| JP | 2000-165440 | 6/2000 |
| WO | WO 02/25859 | 3/2002 |
| WO | WO 2006/134412 | 12/2006 |

OTHER PUBLICATIONS

R.M. Kalafus, New RTCM SC-104 standard for differential GNSS, Journal of the Institute of Navigation, vol. 43(4), p. 175-181, Winter 1996-1997.*
M. Kuhn, A summary of the international standard date and time notation, http://www.cl.cam.ac.uk/~mgk25/iso-time.html, Dec. 2004.*
3$^{rd}$ Generation Partnership Project; Technical Specification Group GSM/EDGE Radio Access Network; Location Services (LCS); Mobile Staton (MS) — Serving Mobile Location Centre (SMLC), Radio Resource LCS Protocol (RRLP) (Release 7); 3GPP TS 44.031 V7.2.0 (Nov. 2005); whole document.

(Continued)

*Primary Examiner*—Thomas H Tarcza
*Assistant Examiner*—Fred H Mull
(74) *Attorney, Agent, or Firm*—Alfred A. Fressola; Ware, Fressola, Van Der Sluys & Adolphson LLP (57) ABSTRACT

For enhancing the transmission of time related information, a message is received or assembled, which includes a reference time identifier. The received or assembled message is provided for transmission. At a receiving end, the reference time identifier and additional information are extracted from a received message, and the additional information is processed taking account of the reference time identifier. Alternatively or in addition, the message may include a reference time, which is indicated in units of seconds.

22 Claims, 6 Drawing Sheets

| Information Element/Group name | Need | Multi | Type and Reference | Semantics description |
|---|---|---|---|---|
| CHOICE *Reference Time* | MP | | | |
| GNSS_TIME_ID | MP | | Integer(0..7) | Identifies the time reference. 0 = Galileo System Time 1 = GPS System Time 2 = GLONASS System Time 3 = UTC time 4..7 = reserved for future use |
| >UTRAN GNSS reference time | | | | |
| >>UE GNSS timing of cell frames | MP | | Integer(0.. 530841599 9999) | GNSS Time of Day in units of 1/16$^{th}$ UMTS chips (or in seconds) |
| >>CHOICE *mode* | MP | | | |
| >>>FDD | | | | |
| >>>>Primary CPICH Info | MP | | Primary CPICH Info | Identifies the reference cell for the GNSS TOD-SFN relationship |
| >>>TDD | | | | |
| >>cell parameters id | MP | | Cell parameters id | Identifies the reference cell for the GNSS TOD-SFN relationship. |
| >>Reference SFN | MP | | Integer(0..4 095) | The SFN for which the location is valid. This IE indicates the SFN at which the UE timing of cell frame is captured. |
| >GNSS reference time only | | | | |
| >>GNSS TOD | MP | | Integer(0..8 .64*10$^7$-1) | GNSS Time of Day in milliseconds (rounded down to the nearest millisecond unit). |
| >Cell timing | | | | |
| >>SFN | MP | | Integer(0..4 095) | SFN during which the position was calculated. |
| >>CHOICE *mode* | MP | | | |
| >>>FDD | | | | |
| >>>>Primary CPICH Info | MP | | Primary CPICH Info | Identifies the reference cell for SFN |
| >>>TDD | | | | |
| >>cell parameters id | MP | | Cell parameters id | Identifies reference cell for SFN |

OTHER PUBLICATIONS

3rd Generation Partnership Project; "A-GNSS support to RRLP;" 3GPP TSG-GERAN2; Tdoc G2-060273; Meeting #31bis; Turin, Italy Oct. 16-20, 2006; whole document.

3rd Generation Partnership Project; "Introduction of Assisted Galileo capability as an Assisted GNSS into the GERAN;" 3GPP TSG-GERAN WG2; G2-060315 Agenda: 5.3.10; Meeting #31 bis; Turin, Italy, Oct. 16-20, 2006; whole document.

3rd Generation Partnership Project; "Technical Specification Group Radio Access Network; Radio Resource Control (RRC); Protocol Specification (Release 7);" 3GPP TS 25.331 V7.0.0 (Mar. 2006); relevant chapters: 8.6.7.19; 10.2.48.8.18; 10.3.3.45; 10.3.7.86 through 10.3.7.112; 13.4.28a and 14.7(all).x.

"3rd Generation Partnership Project: Technical Specification Group GSM EDGE Radio Access Network; Location Services (LCS); Broadcast Network Assistance for Enhanced Observed Time Difference (E-OTD) and Global Positioning System (gps) Positioning Methods (Release 1999);" 3GPP TS 04.35 V8.3.0, Jan. 1, 2001; pp. 1-35.

* cited by examiner

| Information Element/Group name | Need | Multi | Type and Reference | Semantics description |
|---|---|---|---|---|
| CHOICE *Reference Time* | MP | | | |
| GNSS_TIME_ID | MP | | Integer(0..7) | Identifies the time reference.<br>0 = Galileo System Time<br>1 = GPS System Time<br>2 = GLONASS System Time<br>3 = UTC time<br>4..7 = reserved for future use |
| >UTRAN GNSS reference time | | | | |
| >>UE GNSS timing of cell frames | MP | | Integer(0..5308415999999) | GNSS Time of Day in units of 1/16$^{th}$ UMTS chips (or in seconds) |
| >>CHOICE *mode* | MP | | | |
| >>>FDD | | | | |
| >>>>Primary CPICH Info | MP | | Primary CPICH Info | Identifies the reference cell for the GNSS TOD-SFN relationship |
| >>>TDD | | | | |
| >>cell parameters id | MP | | Cell parameters id | Identifies the reference cell for the GNSS TOD-SFN relationship. |
| >>Reference SFN | MP | | Integer(0..4095) | The SFN for which the location is valid. This IE indicates the SFN at which the UE timing of cell frame is captured. |
| >GNSS reference time only | | | | |
| >>GNSS TOD | MP | | Integer(0..8.64*10$^7$-1) | GNSS Time of Day in milliseconds (rounded down to the nearest millisecond unit). |
| >Cell timing | | | | |
| >>SFN | MP | | Integer(0..4095) | SFN during which the position was calculated. |
| >>CHOICE *mode* | MP | | | |
| >>>FDD | | | | |
| >>>>Primary CPICH Info | MP | | Primary CPICH Info | Identifies the reference cell for SFN |
| >>>TDD | | | | |
| >>cell parameters id | MP | | Cell parameters id | Identifies reference cell for SFN |

| Information Element/Group name | Need | Multi | Type and Reference | Semantics description |
|---|---|---|---|---|
| GNSS DN | MP | | Integer(0..8191) | GNSS Day Number |
| GNSS TOD | MP | | Integer(0..8.64*10$^7$-1) | GNSS Time of Day in milliseconds (rounded down to the nearest millisecond unit). |
| GNSS_TIME_ID | MP | | Integer(0..7) | Identifies the time reference.<br>0 = Galileo System Time<br>1 = GPS System Time<br>2 = GLONASS System Time<br>3 = UTC time<br>4..7 = reserved for future use |
| UTRAN GNSS reference time | OP | | | |
| >UTRAN GNSS timing of cell frames | MP | | Integer(0..331775999999) | UTRAN GNSS timing of cell frames in steps of 1 chip (or in seconds) |
| >CHOICE mode | OP | | | |
| >>FDD | | | | |
| >>>Primary CPICH Info | MP | | Primary CPICH Info | Identifies the reference cell for the GNSS TOD-SFN relationship |
| >>TDD | | | | |
| >>>cell parameters id | MP | | Cell parameters id | Identifies the reference cell for the GNSS TOD-SFN relationship |
| >SFN | MP | | Integer(0..4095) | The SFN which the UTRAN GNSS timing of cell frames time stamps. |
| SFN-TOD Uncertainty | OP | | Enumerated (lessThan10, moreThan10) | This field indicates the uncertainty of the relation GNSS TOD/SFN. lessThan10 means the relation is accurate to at least 10 ms. |
| $T_{UTRAN-GNSS}$ drift rate | OP | | Integer (0, 1, 2, 5, 10, 15, 25, 50, -1, -2, -5, -10, -15, -25, -50) | in 1/256 chips per sec. (or in s/s) |

Fig. 6

PROVIDING AND USING MESSAGES INCLUDING TIME RELATED INFORMATION

CROSS REFERENCE TO RELATED APPLICATIONS

This application is a continuation-in-part of U.S. patent application Ser. No. 11/588,838 which was filed on Oct. 27, 2006 and also claims priority under §119(e) to U.S. provisional application 60/879,952 which was filed on Jan. 10, 2007.

FIELD OF THE INVENTION

The invention relates to providing and using messages including time related information.

BACKGROUND OF THE INVENTION

A positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

The constellation in GPS, for example, consists of more than 20 satellites that orbit the earth. Currently, each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the signals used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

A GNSS positioning can be performed in different positioning modes.

A first mode is a standalone mobile station based GNSS positioning. In this mode, the GNSS receiver receives signals from GNSS satellites. The GNSS receiver or an associated mobile device—referred to in common as mobile station—decodes navigation data directly from the satellite signals and calculates from these signals and the navigation data the position of the mobile station and other location information without any additional information from other sources.

A second mode is a network-assisted mobile station based GNSS positioning. In this mode, the GNSS receiver is associated to a mobile communication device. The GNSS receiver can be integrated into the mobile communication device or be an accessory for the mobile communication device. GNSS receiver and mobile communication device are referred to in common as mobile station. A mobile communication network provides assistance data, which is received by the mobile communication device. The assistance data can comprise for example ephemeris, position and time information. The assistance data can be used by GNSS receiver to improve its performance when acquiring and tracking satellite signals. Alternatively or in addition, the assistance data can be used at the mobile station in calculating the position of the mobile station and other location information. With provided assistance data, for example, it may not be required to decode the navigation information in tracked satellite signals.

The third mode is a network-based mobile station assisted GNSS positioning. For this mode, the GNSS receiver is associated as well to a mobile communication device. GNSS receiver and mobile communication device are referred to in common as mobile station. In this mode, a mobile communication network provides at least acquisition assistance and time information via the mobile communication device to the GNSS receiver for supporting the satellite signal measurements. The mobile station only performs signal measurements, though, and reports the measurements back to the network for position calculation.

The second and the third mode are also referred to in common as assisted-GNSS (A-GNSS). Assisted GNSS thus means that if the technical prerequisites are met, a mobile communication network is able to provide a GNSS receiver with assistance data, like time and navigation model, which allows the receiver to obtain a position fix in a shorter time and in more challenging signal conditions.

A network server, which generates assistance data and/or calculates position solutions for A-GNSS, can be for example the Serving Mobile Location Center (SMLC) server.

Regardless of the positioning mode, the SMLC can assist the mobile station for instance with accurate time assistance in order to speed up the Time-To-First-Fix and to increase the sensitivity of the mobile station to acquire very weak satellite signals. Accurate time assistance may be delivered from the SMLC to the mobile station as a time relation between the cellular system frame time, which is referred to as System Frame Number (SFN), and a satellite system time. In order words, the SMLC gives the mobile station information what GPS system time was/is/will be on a certain specific frame number identified by the SFN. Typically, the SFN that is taken as the timing reference is selected close to the current SFN in order to minimize any errors caused by base station clock drift in extrapolating the time estimate to real time. An estimate of the base station clock drift with respect to the GPS time can optionally be included in the assistance data to mitigate the clock drift based errors.

Typically, the mobile station also solves accurate GNSS time along with the position and possibly also calculates a relation between the GNSS system time and cellular SFN. The time relation can be used locally in the mobile station to maintain or recover accurate time with the help of SFN. Alternatively or in addition, the relation can be sent to an SMLC, for SMLC based maintenance of time relations and even for distribution to other mobile stations.

In both mobile station based modes, a network server can also request more comprehensive location information determined by the mobile station. Such location information may be used for example for location based services requested by the mobile station or by another entity, such as a friend finding service or a Yellow Pages service. In this case, the mobile station will send the location information that it has determined in the position calculations to the network server using a dedicated location information message or location information elements (IE) in another message. Location information elements are defined in different cellular standards and typically comprise:
1. Position information in the World Geodetic System 1984 (WGS-84) coordinate frame, including latitude, longitude and altitude
2. Position uncertainty ellipse
3. Velocity information, including velocity components in a local coordinate frame: heading, heading uncertainty, horizontal speed, horizontal speed uncertainty, vertical speed, vertical speed uncertainty
4. Cellular frame time—satellite time associations
5. Reference time, that is, the time when the location information was calculated and which is to be used as the reference for the cellular frame time—satellite time associations. The reference time is preferably given either in units of seconds [s] or milliseconds [ms].

SUMMARY OF THE DISCLOSURE

The invention proceeds from the consideration that the messages for location information currently defined in cellular standards are based on GPS time only, because GPS has been the only fully and globally available GNSS so far.

Different GNSSs, however, have different system times. Consequently, the available definitions of messages for location information do not allow referring location information to any other time base than GPS, such as UTC, Galileo, GLONASS, QZSS etc. The currently defined messages are thus not applicable to any other GNSS than GPS. For example, a mobile station supporting a Galileo based positioning only cannot use the currently defined messages to report generated location information to a server, since the mobile station does not have any access to GPS time. The messages for location information thus have to be redefined to be compatible with upcoming systems.

It would be possible to define separate messages for location information for each GNSS, but this would increase the number of definitions significantly. Alternatively, it would be possible to require that UTC is used for all systems, but this would render the use of GNSS less flexible.

I

According to a first aspect, the following is described:
A method comprising:
receiving or assembling a message including a reference time identifier; and
providing the message for transmission.
In one exemplary embodiment of the described method, the message further includes a reference time identified by the reference time identifier.
In one exemplary embodiment of the described method, the message further includes assistance data for a satellite based positioning, and the reference time identifier identifies a reference time used for the assistance data.
In one exemplary embodiment of the described method, the messages further includes time relation information indicating the relation between a time of different systems, and the reference time identifier identifies one of the systems.
In one exemplary embodiment of the described method, the message further includes location information, which has been determined based on satellite signals, and wherein the reference time identifier identifies a reference time used in determining the location information.
In one exemplary embodiment of the described method, a reference time identifier is defined for at least one of:
a Galileo positioning system;
a global positioning system;
a global orbiting navigation satellite system;
a space based augmentation system;
a quasi-zenith satellite system; and
a coordinated universal time.
An apparatus comprising a processing component
configured to receive or to assemble a message including location information and a reference time identifier, the location information being determined based on satellite signals and the reference time identifier identifying a reference time used in determining the location information; and
configured to provide a received or assembled message for transmission.
In one exemplary embodiment of the described apparatus, the message further includes a reference time identified by the reference time identifier.
In one exemplary embodiment of the described apparatus, the message further includes assistance data for a satellite based positioning, and the reference time identifier identifies a reference time used for the assistance data.
In one exemplary embodiment of the described apparatus, the messages further includes time relation information indicating the relation between a time of different systems, and the reference time identifier identifies one of the systems.
In one exemplary embodiment of the described apparatus, the message further includes location information, which has been determined based on satellite signals, and the reference time identifier identifies a reference time used in determining the location information.
In one exemplary embodiment of the described apparatus, the processing component is configured to select the reference time identifier from a dedicated reference time identifier defined for at least one of:
a Galileo positioning system;
a global positioning system;
a global orbiting navigation satellite system;

a space based augmentation system;
a quasi-zenith satellite system; and
a coordinated universal time.

An electronic device comprising:
the described apparatus; and
a global navigation satellite system receiver configured to receive the satellite signals.

In one exemplary embodiment, the described electronic device further comprises a communication component configured to enable a communication with another device to which the message is to be transmitted.

An electronic device comprising:
the described apparatus; and
a communication component configured to enable a communication with another device to which the message is to be transmitted.

In one exemplary embodiment, the described electronic device further comprises a communication component configured to enable a communication with device from which the message is to be received.

An assembly comprising:
an electronic device with a global navigation satellite system receiver configured to receive satellite signals; and
an electronic device configured to enable a transmission of a message to another device;
one of the electronic devices including the described apparatus.

A computer program product in which a program code is stored in a computer readable medium, the program code realizing the described method when executed by a processor.

An apparatus comprising:
means for receiving or assembling a message including a reference time identifier; and
means for providing the message for transmission.

II

According to a second aspect, the following is described:

A method comprising:
extracting from a received message a reference time identifier and additional information; and
processing the additional information taking account of the reference time identifier.

An apparatus comprising a processing component
configured to extract from a received message a reference time identifier and additional information; and
configured to process the additional information taking account of the reference time identifier.

An electronic device comprising:
the described apparatus; and
an interface configured to enable a communication with another device for receiving the message.

In one exemplary embodiment of the described electronic device, the electronic device is one of a mobile terminal and a network server.

A computer program product in which a program code is stored in a computer readable medium, the program code realizing the described method when executed by a processor.

An apparatus comprising:
means for extracting from a received message a reference time identifier and additional information; and
means for processing the additional information taking account of the reference time identifier.

A system comprising:
the described apparatus; and
the apparatus described further above for the first aspect.

III

According to a third aspect, the following is described:

A method comprising:
receiving or assembling a message including a reference time, wherein the reference time is indicated in seconds; and
providing the message for transmission.

An apparatus comprising a processing component
configured to receive or assemble a message including a reference time, wherein the reference time is indicated in seconds; and
configured to provide a received or assembled message for transmission.

An electronic device comprising:
the described apparatus; and
a global navigation satellite system receiver configured to receive the satellite signals.

An electronic device comprising:
the described apparatus; and
a communication component configured to enable a communication with another device.

An assembly comprising:
an electronic device with a global navigation satellite system receiver configured to receive satellite signals; and
an electronic device configured to enable a transmission of a message to another device;
one of the electronic devices including the described apparatus.

A computer program product in which a program code is stored in a computer readable medium, the program code realizing the described method when executed by a processor.

An apparatus comprising:
means for receiving or assembling a message including a reference time, wherein the reference time is indicated in seconds; and
means for providing the message for transmission.

IV

According to a fourth aspect, the following is described:

A method comprising:
extracting from a received message a reference time, wherein the reference time is indicated in seconds; and
processing the reference time taking account of the indication in seconds.

An apparatus comprising a processing component
configured to extract from a received message a reference time, wherein the reference time is indicated in seconds; and
configured to process the reference time taking account of the indication in seconds.

An electronic device comprising:
the described apparatus; and
an interface configured to enable a communication with another device for receiving the message.

A computer program product in which a program code is stored in a computer readable medium, the program code realizing the described method when executed by a processor.

An apparatus comprising:
means for extracting from a received message a reference time, wherein the reference time is indicated in seconds; and means for processing the reference time taking account of the indication in seconds.

A system comprising:
the described apparatus; and
the apparatus described further above for the third aspect.

V

The first and the second aspect thus propose using a reference time identifier in a message that is transmitted between devices. The identifier could be included in a generic time indication field of a message structure. It could be used for instance for assistance messages, which support a satellite based positioning, and for information messages, which provide results of a satellite based positioning. The assistance message may include only time assistance or more comprehensive assistance data, while the information message may comprise only time information or more comprehensive location information.

It is to be understood that the expressions 'location information' and 'location information message' are used in a comprehensive sense in this document. While these expressions are used for instance in GSM specifications, they are intended to relate as well to corresponding information and messages in any other communication system. In the case of UMTS, for instance, they might also be referred to as 'user equipment (UE) positioning position estimate information' and 'user equipment (UE) positioning position estimate information message'.

The reference time identifier may identify which type of time, for example UTC or any GNSS system time, has been used as a basis for other information in the message. This other information may include any time related information, in particular an absolute or relative reference time. A relative reference time may indicate the relation between different system times, for example between a GNSS time and a communication system time, like a 'GNSS system time to SFN' relation. Further, the reference time may define the time at which assistance data or location data has been generated. The reference time identifier may also be used for indicating the format of some parameters included in the message, if the format is different for different systems.

In general, the proposed reference time identifier makes it possible to use the same assistance and information messages with any GNSS system time or even with a UTC. This will reduce the complexity in specifications and implementations, as there is no need to specify satellite system time specific messages.

The first and the second aspect can also be implemented in a manner that is forward compatible, simply by reserving a few values of the identifier for future systems.

The reference time identifier can be included in a mandatory field or in an optional field of a message. If it is included in an optional field, a default reference time could be defined, for example a coordinated universal time. A reference time identifier may then be included in the message only, in case the used reference time is different from the default reference time.

The additional information that may be included in a message can be defined as desired. It may include for example an indication of a position, of a velocity, of a time and/or of time associations. A time associations may be for instance Cellular Frame Time—Satellite Time associations.

Conventionally, accurate time information is transmitted in terms of Universal Mobile Telecommunications System (UMTS) chips and related to a UMTS SFN.

According to the first and the second aspects of the invention, time information included in the message could still be reported in chips—or units—that are specific to a particular communication system, like the UMTS.

The third and fourth aspects of the invention propose to change the unit of time information included in a message from chips to seconds. The format of the time information is thus generalized so that the same message structure could be used for any communication system, including UMTS, 3.9G, Worldwide Interoperability for Microwave Access (WiMax), etc. In case the message is to comprise other parameters, all the parameters in a message could be defined in such a general format, in order to ensure a general usability.

The following relates to all described aspects:

Any of the mentioned processing components can be implemented in hardware and/or software. It may be for instance a processor executing software program code for realizing the required functions. Alternatively, it could be for instance a circuit that is designed to realize the required functions, for instance implemented in a chipset or a chip, like an integrated circuit. Any described apparatus can be for example identical to the comprised processing component, but it may also comprise additional components. The apparatus could further be for example a module provided for integration into an electronic device, like a wireless communication device, a GNSS accessory device or a network server, like an SMLC server.

Each of the mentioned communication components can be for instance, though not exclusively, a cellular engine or a Wireless Local Access Network (WLAN) engine. The described electronic devices can be for instance a mobile station receiving or transmitting an assembled message, like a cellular terminal, a WLAN terminal or an accessory device. Examples of terminals are a mobile phone or a laptop. An example of an accessory device is a GNSS accessory device. The described electronic devices could also be stationary devices, like a network server which assembles the described message for transmission, or a network server or gateway which receives an assembled message for processing it or for forwarding it.

The devices of each of the described assemblies can be liked to each other with any suitable data link, for example a fixed cable, a Bluetooth™ link, an Ultra Wideband (UWB) link or an Infrared link, etc.

Each of the described computer program products could be for example a separate memory device, or a memory that is to be integrated in an electronic device. The invention is to be understood to cover the described computer program codes also independently from a computer program product and a computer readable medium.

The described aspects can be used for example with any kind of GNSS positioning, like GPS, GLONASS, GALILEO, SBAS, QZSS, LAAS or any combination of these. Consequently, a dedicated identifier for a reference time may be defined for example for the Galileo positioning system, for GPS (including modernized GPS), for GLONASS, for SBAS, for QZSS, for LAAS and/or for UTC, but equally for any other system time, including any future system time.

The invention can further be used for instance for enhancing 3GPP GERAN ($3^{rd}$ Generation Partnership Program GSM (Global System for Mobile Communications)/EDGE (Enhanced Data Rates for GSM Evolution) Radio Access Network), 3GPP RAN (Radio Access Network) and OMA SUPL (Open Mobile Alliance Secure User Plane Location) protocols.

It is to be understood that the described aspects and any of their embodiments can also be used in any suitable combination.

Also the following embodiments can be combined with any other embodiment:

In one embodiment, a message is received or assembled, which includes location information and a reference time identifier. The location information is assumed to be determined based on satellite signals and the reference time identifier identifies a reference time used in determining the location information. The message may be provided for transmission.

In a further embodiment, location information and a reference time identifier are extracted from a received message. The location information was determined based on satellite signals and the reference time identifier identifies a reference time used in determining the location information. The location information may further be processed taking account of the reference time identifier.

Further details and variations of these embodiments can be found in the appended annex which relates to U.S. patent application Ser. No. 11/588,838 filed Oct. 27, 2006. It is also related to earlier filed PCT Application PCT/IB2005/001638 filed Jun. 13, 2005 published as WO 2006/134412 A1 Dec. 21, 2006.

In these embodiments, a reference time identity is included in a message conveying location information, to identify one of various possible types of time that has been used as the reference time for the location information, while all conventional approaches support only a single type of reference time.

One use case is thus identifying a used reference time for location information in a satellite based positioning, which allows using a single message definition with any GNSS.

A new message may be defined to this end that can be used for instance to transmit location information from a mobile station or a mobile assembly to a server using any GNSS specific system time or UTC as the reference time. This enables the mobile station or the mobile assembly to use any type of reference time for generating the location information and the server to unambiguously identify which type of reference time is used. This is beneficial, since the server may not know in advance which GNSS is supported by a mobile station or mobile assembly and/or which satellites of which satellite systems are available at the position of the mobile station or the mobile assembly for time decoding.

Alternatively, a single message may be defined, for instance, which allows transmitting location information from a server to another server using any GNSS specific system time or UTC as the reference time. The connection between the servers can be a dedicated network connection or the Internet. An example of the server system is that the first server has only a positioning function either to receive location information from the mobile stations or to calculate the location information from the measurements received from the mobile stations. The second server does not necessarily have any position calculation functionality, but it has only the functionality to use the location information for certain location based services such as Friend Finding or Yellow Page searches.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
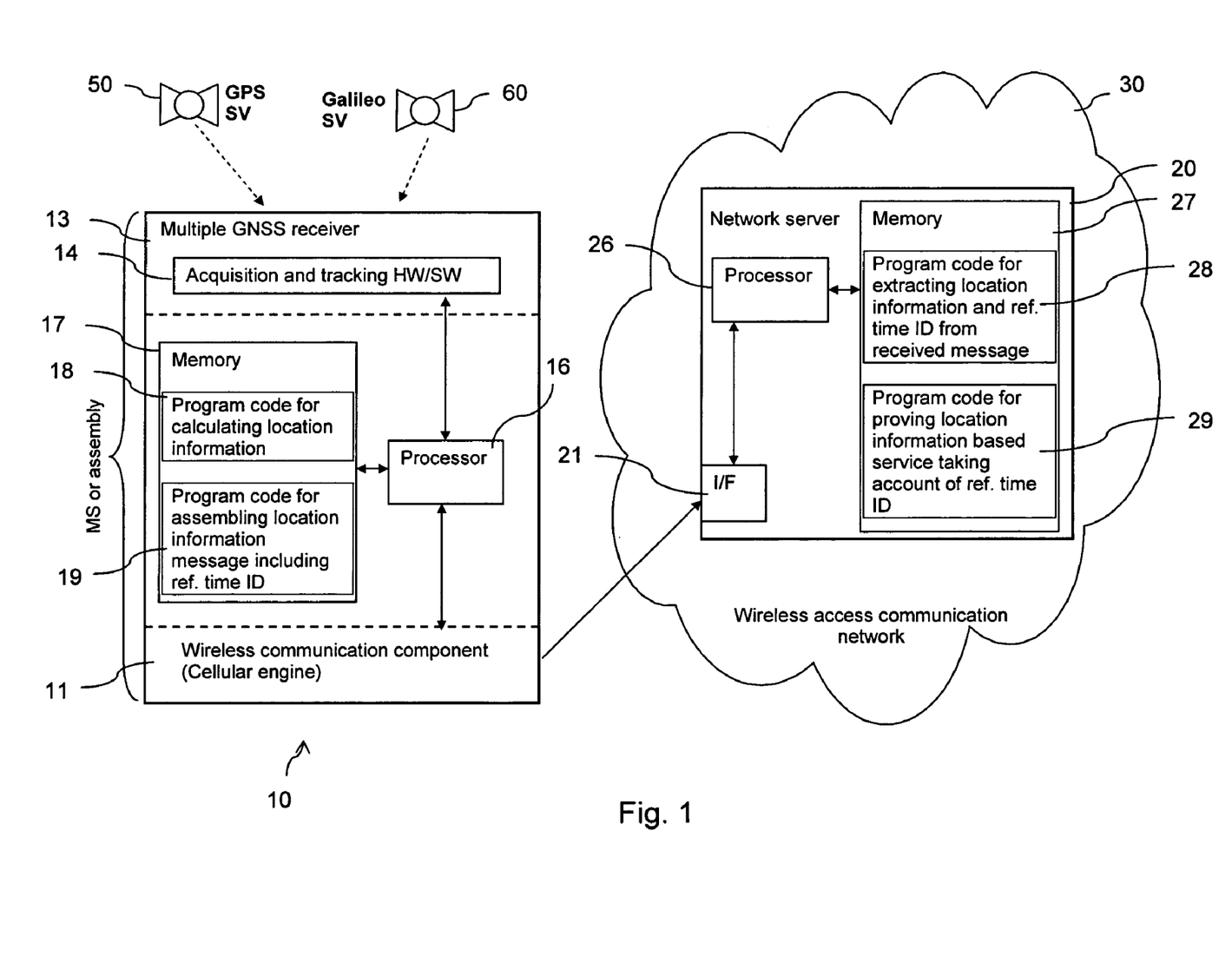
FIG. 1 is a schematic block diagram of a system according to an embodiment of the invention.

FIG. 1 is a schematic block diagram of an exemplary system, which facilitates the transmission of time related information.

The system comprises a mobile station 10 and a network server 20 of a GSM network 30 or of any other communication network that enables a wireless access. The system further comprises GNSS satellites, for example GPS satellites (GPS SV) 50 and Galileo satellites (Galileo SV) 60. Alternative or additional satellites could be for instance GLONASS, SBAS, QZSS or LAAS satellites. The term mobile station (MS) will be used synonymously with the term user equipment (UE).

The mobile station 10 comprises a wireless communication component 11, a GNSS receiver 13, a processor 16 and a memory 17. The processor 16 is linked to each of the other components 11, 13, 17.

The mobile communication component 11 could be for instance a cellular engine. A cellular engine is a module which comprises all components required for a conventional mobile communication between a mobile terminal and a cellular communication network 30 and which may further be enhanced with additional functions. In one embodiment, the functions of processor 16 and memory 17 could also be implemented in a processor and a memory of such a cellular engine.

The GNSS receiver 13 may be configured to be able to receive signals from a single type of GNSS satellites or from different types of GNSSs satellites 50, 60. The GNSS receiver 13 includes an acquisition and tracking component 14, which may be realized in hardware and/or in software. For instance, for acquiring and tracking signals received from GPS satellites 50 or Galileo satellites 60, signal measurement tasks, including correlation tasks, could be performed by hardware under control of a software code which is executed by a processing unit of the GNSS receiver 13. In one embodiment, the functions of processor 16 and memory 17 could also be implemented in a processor and a memory of such a GNSS receiver 13. In another embodiment, the wireless communication component 11 could be enhanced to take care of any software based processing that is required by the GNSS receiver 13.

The processor 16 is configured to execute implemented computer program code for realizing various functions. The memory 17 is configured to store computer program code, which may be retrieved by the processor 16 for execution. The stored code includes computer program code 18 for calculating location information using a GNSS based positioning and computer program code 19 for assembling location information messages including a reference time identity (ID).

It is to be understood that the functions of the processor 16 executing computer program code 18 and 19' could equally be implemented by circuitry, for example in an integrated circuit.

Instead of a single-device mobile station 10, also a mobile assembly 10 could be used, which is indicated in FIG. 1 by dashed lines. Such a mobile assembly 10 could include a mobile terminal with mobile communication component 11 and a GNSS accessory device with GNSS receiver 13. The processor 16 and the memory 17 could belong either to the mobile terminal or to the GNSS accessory device.

The network server 20 comprises a processor 26 and, linked to this processor 26, an interface 21 and a memory 27.

The interface 21 is configured to enable a communication with mobile stations 10 accessing the network 30. The communication is enabled more specifically via some other elements of the network 30 not shown, including for example base transceiver stations (BTS).

The processor 26 is configured to execute implemented computer program code for realizing various functions. The memory 27 is configured to store computer program code, which may be retrieved by the processor 26 for execution. The stored code includes computer program code 28 for extracting location information and reference time ID from a received location information message. Further, it includes computer program code 29 for providing at least one location based service. Such a service may be for instance a friend-finding service or a yellow pages service providing business locations of a desired type close to the current location of a requesting mobile station 10.

It is to be understood that the functions of the processor 26 executing computer program code 28 and 29 could equally be implemented by circuitry, for example in an integrated circuit.

An operation in the system of FIG. 1 will now be described with reference to FIGS. 2 and 3.

Figure 2:
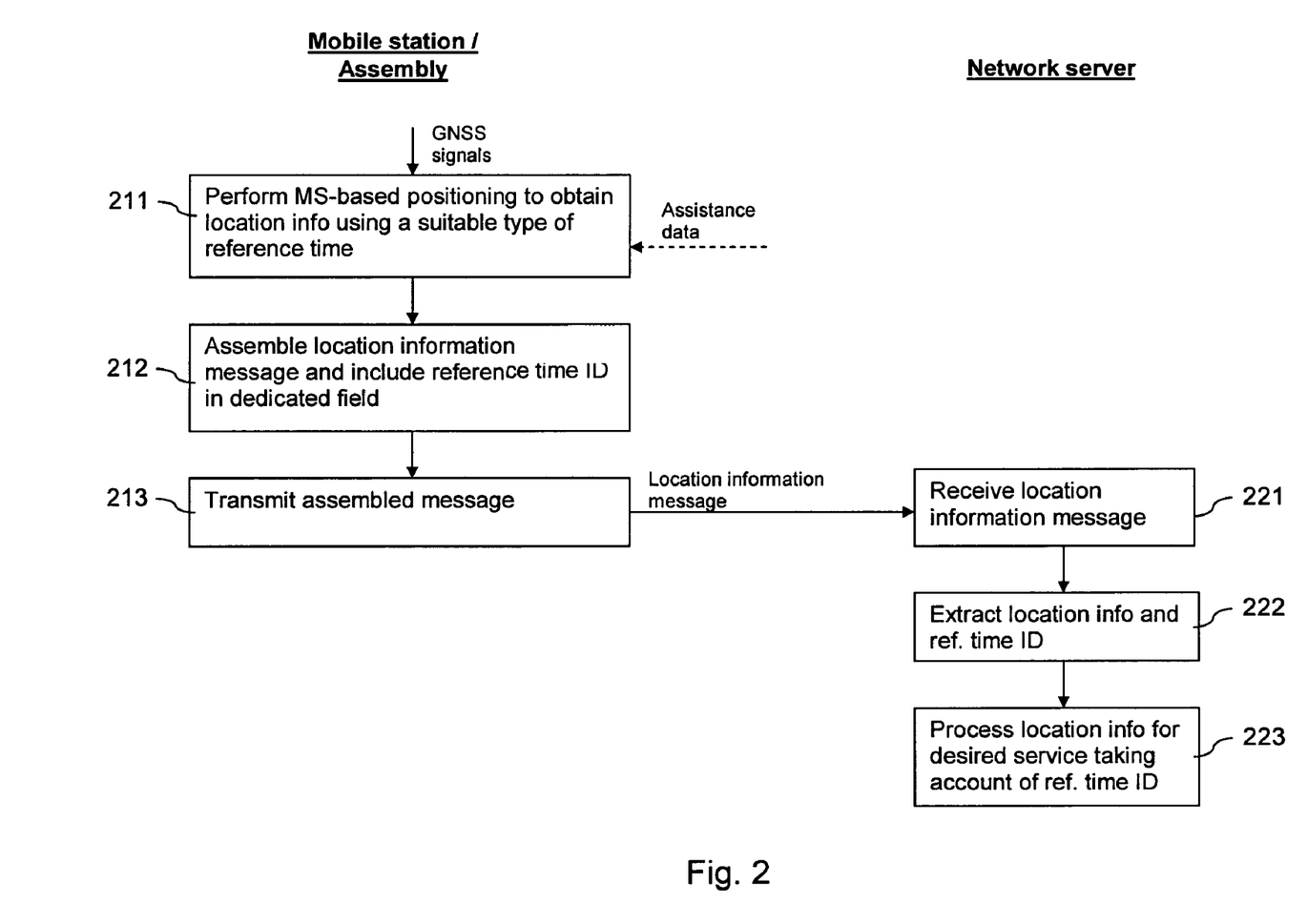
FIG. 2 is a flow chart illustrating an operation in the system of FIG. 1.

FIG. 2 is a flow chart illustrating on the left hand side an operation at the mobile station 10 and on the right hand side an operation at the network server 20.

At the mobile station 10, the acquisition and tracking component 14 of the GNSS receiver 13 acquires and tracks satellite signals and provides the measurement results to the processor 16. The processor 16 executes computer program code 18 to perform a mobile based positioning based on the signal measurements (step 211). Optionally, the acquisition and tracking of the GNSS receiver 13 and/or the positioning calculations of the processor 16 may be supported by assistance data, which is provided by the network 30 and received via the wireless communication component 11.

For the positioning calculations, the processor 16 uses a suitable type of reference time. It could use for instance the GPS time in case the positioning is based on GPS satellite signals, the Galileo system time in case the positioning is based on Galileo satellite signals, or the UTC in case the positioning is based on both GPS and Galileo satellite signals, etc. In case the GNSS receiver 13 is configured to be able to receive signals from a single type of GNSS satellites, it will always use the same type of reference time.

The reference time is used at the mobile station 10 in satellite position calculation and as time reference in GNSS System Time—UMTS Time associations and/or other associations such as GNSS—GSM or GNSS—WLAN Frame Timing associations, etc.

The processor 16 further executes computer program code 19 to assemble the resulting location information in a location information message or in a location information element of a more comprehensive message (step 212). In addition to the actual location information, a reference time ID is included, which indicates the type of the reference time that was used in the positioning calculations. In case the GNSS receiver 13 is configured to be able to receive signals from a single type of GNSS satellite, it may always use the same reference time ID.

Figure 3:
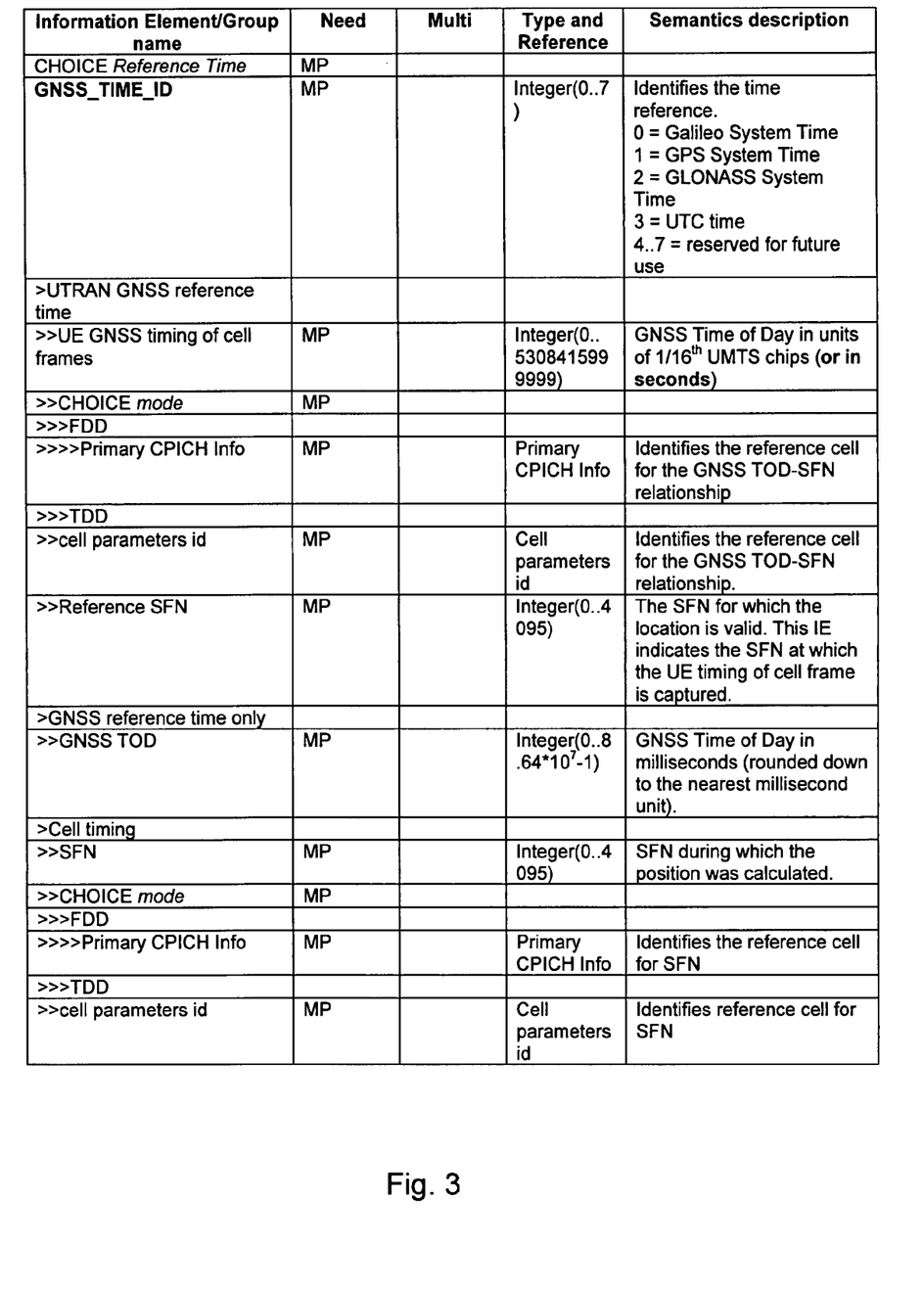
FIG. 3 is a table illustrating the insertion of a field for a reference time identifier in a position estimate information message.

FIG. 3 is a table presenting exemplary defined parameters that may be selected for assembling the message or the information element. The table defines a message or information element suited to transmit a GNSS system time—SFN relation from the mobile station 10 to the network server 20 in generic format. It is to be understood that it may be enhanced with other location information parameters. A first column labeled "Information Element/Group name" indicates the parameter names. Optional parameters are marked by an "OP" in a "Need" column, while mandatory parameters are marked by an "MP" in the "Need" column. A third column labeled "Multi" in not used here. A fourth column labeled "Type and Reference" indicates the type of the respective parameter and the allowed values. A fifth column includes a semantics description for each parameter.

One of the mandatory parameters is a GNNS_TIME_ID parameter. The GNSS_TIME_ID parameter indicates a reference time ID defining which system time has been used as the reference for the time information indicated in other fields.

Each reference time ID is represented by another integer value between zero and seven so that each integer value may be coded by three bits. The Galileo system time could be represented by a zero, the GPS time, including the time of a modernized GPS, could by represented by a one, the GLONASS time could by represented by a two and the UTC time could by represented by a three. The integer values four to seven could be reserved for future use, for example for the SBAS time and/or the QZSS time.

It is to be understood that in an alternative embodiment, the GNSS_TIME_ID parameter could also be an optional parameter. In this case, if the parameter value is missing in a message, for instance a default type of reference time could be assumed.

Other defined parameters include for the use of a UMTS Terrestrial Radio Access Network (UTRAN) GNSS reference time a 'UE GNSS timing of cell frames' parameter, which indicates a GNSS Time of Day in units of $\frac{1}{16}$th UMTS chips. Alternatively, it could indicate a GNSS Time of Day in units of seconds rather than in UMTS chips to be generally applicable to any other system than UMTS as well. In this case, the references to UTRAN in the table of FIG. 3 could also be replaced by a general reference to a 'communication system radio access network', while the SFN could be replaced by a general 'frame number'. It has to be noted that both implementations of the time information may still preserve the conventional approach of relating GNSS system time to communication system time, that is, to the edge of a reference frame having an indicated system frame number (SFN).

Other defined parameters include for the use of a GNSS reference time only a 'GNSS TOD' parameter, which indicates the GNSS Time of Day in milliseconds rounded down to the nearest millisecond unit. This parameter specifies the GNSS time for which a location estimate is valid. In the case of GPS, for example, the TOD could be given by the GPS time-of-week (TOW). Additional parameters could further specify this value.

For further parameters presented in FIG. 3, reference is made to the technical specification 3GPP TS 25.331 V7.0.0 (2006-03): "Radio Resource Control (RRC); Protocol Specification (Release 7)", in particular to the described 'UE positioning position estimate information'. This specification also describes additional parameters that could be included and that are not shown in FIG. 3, in particular parameters relating to the actual position estimate, which has been determined for the indicated reference time. Such parameters may comprise an ellipsoid point, a fix type indicating whether the mobile station 10 performed two-dimensional (2D) or three-dimensional (3D) measurements, a stationary indication indicating the presence of a movement of a measuring entity, a location estimate for the mobile station 10 resulting in the positioning calculations, and a velocity estimate for the mobile station 10 resulting in the positioning calculations.

In contrast to this specification, however, any GNSS parameters can be used, not only GPS related parameters, since also the kind of the parameters is defined by the GNSS_TIME_ID parameter. This becomes apparent from the table of FIG. 3 in that it refers in general to GNSS instead of to GPS or another specific system.

The processor 16 provides the assembled location information message or another message comprising the assembled location information element to the wireless communication component 11 for transmission. The assembled location information can be provided in particular together with a request for some location based service offered by the network server 20.

The mobile communication component 11 transmits the received message via other elements of the network 30 to the network server 20 (step 213).

In the network server 20, the interface 21 receives the message (step 221) and provides it to the processor 26.

The processor 26 executes computer program code 28 to extract the location information and the reference time ID from the received message (step 222).

The processor 26 further executes computer program code 29 for providing a desired service based on the extracted location information (step 223). In order to be able to use the location information correctly, the processor 26 takes account of the type of the reference time as defined by the extracted reference time ID that was used in generating the location information. That is, the reference time ID indicates to the processor 26 for instance, which type of reference time has been used for determining the 'UE GNSS timing of cell frames' or the 'GNSS TOD'.

The reference time may be used for instance to evaluate the "age" of the location information and to relate the GNSS System Time—GSM Time associations, or other associations, from multiple mobile stations correctly. For example, if a first mobile station reports the associations with respect to Galileo time and a second mobile station reports the associations with respect to GLONASS time, both mobile stations being involved in a desired service, the server 20 can now compensate the time difference between Galileo and GLONASS times from the time associations.

The reference time identifier of the presented exemplary embodiment thus allows using the same location information message with any GNSS time or even with UTC. As a result, there is no need to specify a plurality of GNSS specific location information messages, which may reduce the complexity of the implementation of network servers and the complexity in the communication system standards.

The presented exemplary embodiment is also forward compatible, since a few values of the reference time identifier GNSS_TIME_ID are reserved for the future systems.

The functions illustrated by the processor 16 executing program code 19 or a corresponding circuitry can also be viewed as means for receiving or assembling a message including a reference time identifier; and as means for providing the message for transmission. Alternatively, they can be viewed as means for receiving or assembling a message including a reference time, wherein the reference time is indicated in seconds; and as means for providing the message for transmission.

The program code 19 can also be viewed as comprising such means in the form of functional modules.

The functions illustrated by the processor 26 executing program code 28 or a corresponding circuitry can also be viewed as means for extracting from a received message a reference time identifier and additional information; while the processor 26 executing program code 29 or a corresponding circuitry can also be viewed as means for processing the additional information taking account of the reference time identifier. Alternatively, they can be viewed as means for extracting from a received message a reference time, wherein the reference time is indicated in seconds; and as means for processing the reference time taking account of the indication in seconds.

The program codes 28 and 29 can also be viewed as comprising such means in the form of functional modules.

Figure 4:
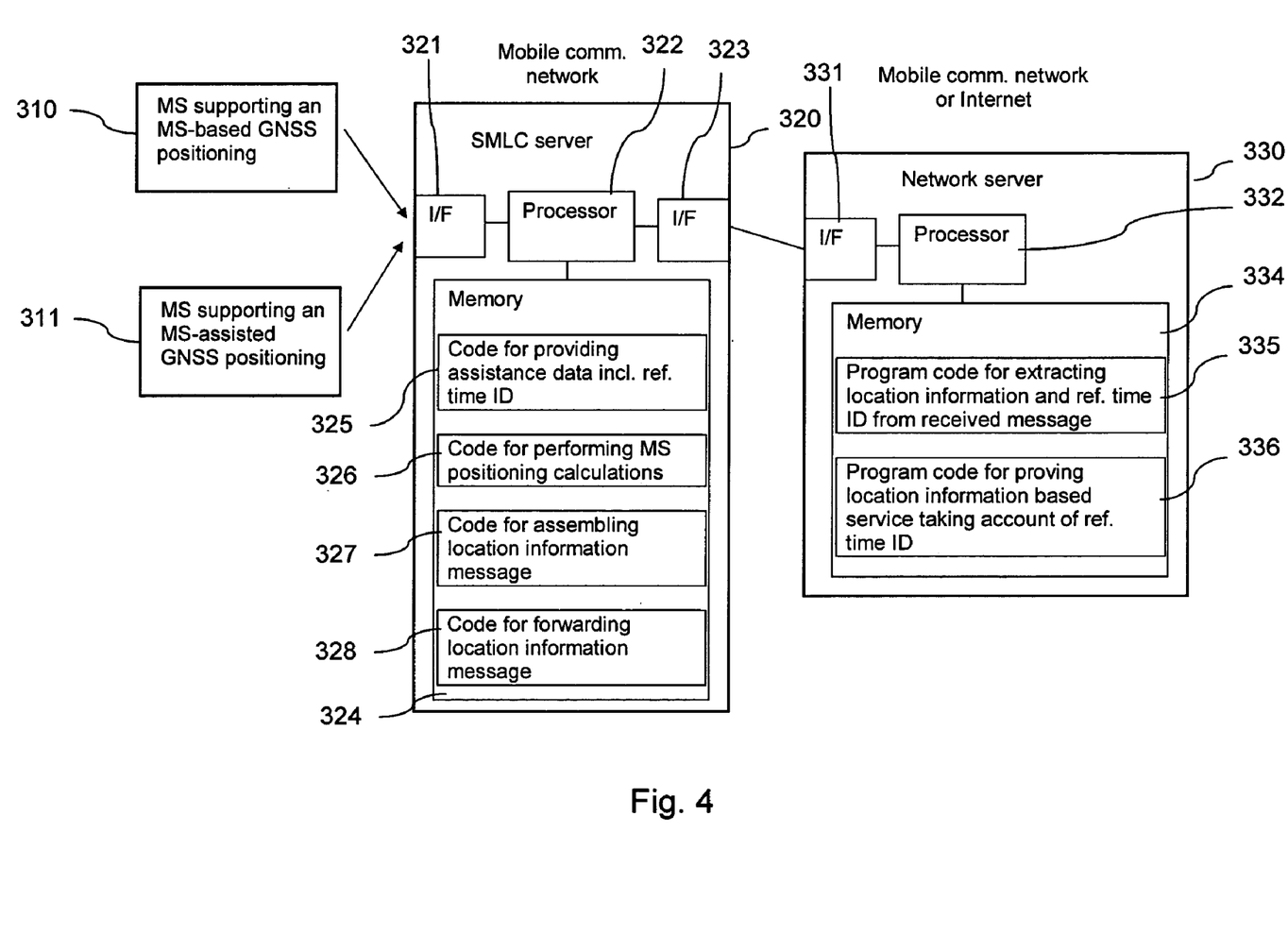
FIG. 4 is a schematic block diagram of a system according to a further embodiment of the invention.

FIG. 4 is a schematic block diagram of another exemplary system, which facilitates the transmission of time related information.

The system comprises a first mobile station 310 including a GNSS receiver and supporting a mobile station based GNSS positioning. It may correspond to the mobile station 10 described above with reference to FIG. 1. The system further comprises a second mobile station 311 including a GNSS receiver and supporting a mobile station assisted GNSS positioning.

The system further comprises a first server 320 and a second server 330.

The first server 320 can be for example an SMLC server. It may belong for example to a mobile communication network which the mobile stations 310, 311 are able to access or to some other network that is linked to this mobile communication network. The server 320 may be basically only a server to assist mobile stations 310, 311 to calculate the fix, to gather location information from mobile stations, to calculate the location information from satellite signal measurements that mobile stations produce or to calculate/determine location information from cellular network measurements and/or information such as Cell-ID, Rx-levels, Timing Advance etc.

Server 320 comprises a processor 322 and, linked to this processor 322 a first interface 321 enabling a communication with mobile stations 310, 311, a second interface enabling a communication with network server 330 and a memory 324. The processor 322 is configured to execute computer program code stored in the memory 324. The stored code includes code 325 for providing assistance data to mobile stations, code 326 for performing positioning calculations based on satellite signal measurement results provided by mobile stations, code 327 for assembling location information messages, and code 328 for forwarding location information messages received from a mobile station.

Network server 330 may be configured to provide location based services. It may belong for instance as well to the mobile communication network which the mobile stations 310, 311 are able to access or to some other network that is linked to this mobile communication network, like the Internet.

Network server 330 comprises a processor 332 and, linked to this processor 332 an interface 331 enabling a communication with network server 320 and a memory 334. The processor 332 is configured to execute computer program code stored in the memory 334. The stored code includes code 335 for extracting location information and a reference time identifier from a received message and code 336 for providing a location based service such as Yellow Pages.

Figure 5:
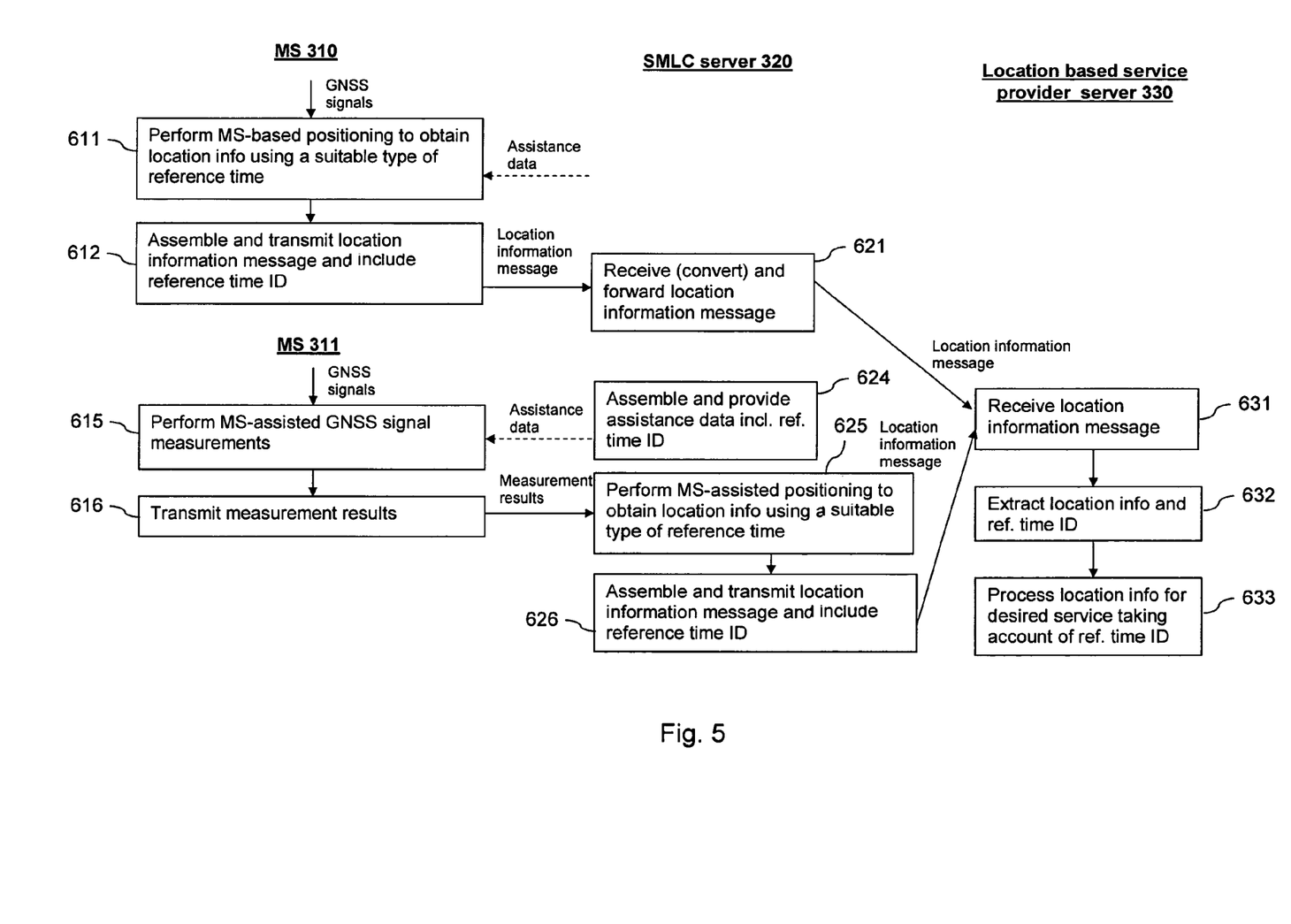
FIG. 5 is a flow chart illustrating an operation in the system of FIG. 4.

An operation in the system of FIG. 4 is illustrated in FIG. 5.

FIG. 5 is a flow chart that presents on the left hand side an operation in mobile stations 310, 311, in the middle an operation in network server 320 and on the right hand side an operation in network server 330.

Mobile station 310 may operate just like mobile station 10 of FIG. 1. Steps 611 and 612 may thus correspond to steps 211, 212 and 213 described above with reference to FIGS. 2 and 3. Mobile station 310 transmits an assembled message comprising location information and a reference time identifier to server 320. The format of the message as far as used for reporting the time relations may correspond again to the format defined in the table of FIG. 3.

In server 320, the processor 322 executing program code 328 receives the message via interface 321 and forwards the message via interface 323 to server 330 (step 621). It is to be understood that the processor 322 may convert the message from a format required by interface 321 to a format required by interface 323. That is, a different message may be defined for the connection between mobile station 310 and server 320 and for the connection between server 320 and server 330.

In addition or alternatively, mobile station 311 performs satellite signal measurements for a mobile station assisted GNSS positioning (step 615). Required assistance data includes a reference time identifier and may be provided by processor 322 executing program code 325 (step 624). The processor 322 may receive the required information for example from a connected local measurement unit (not shown).

Figure 6:
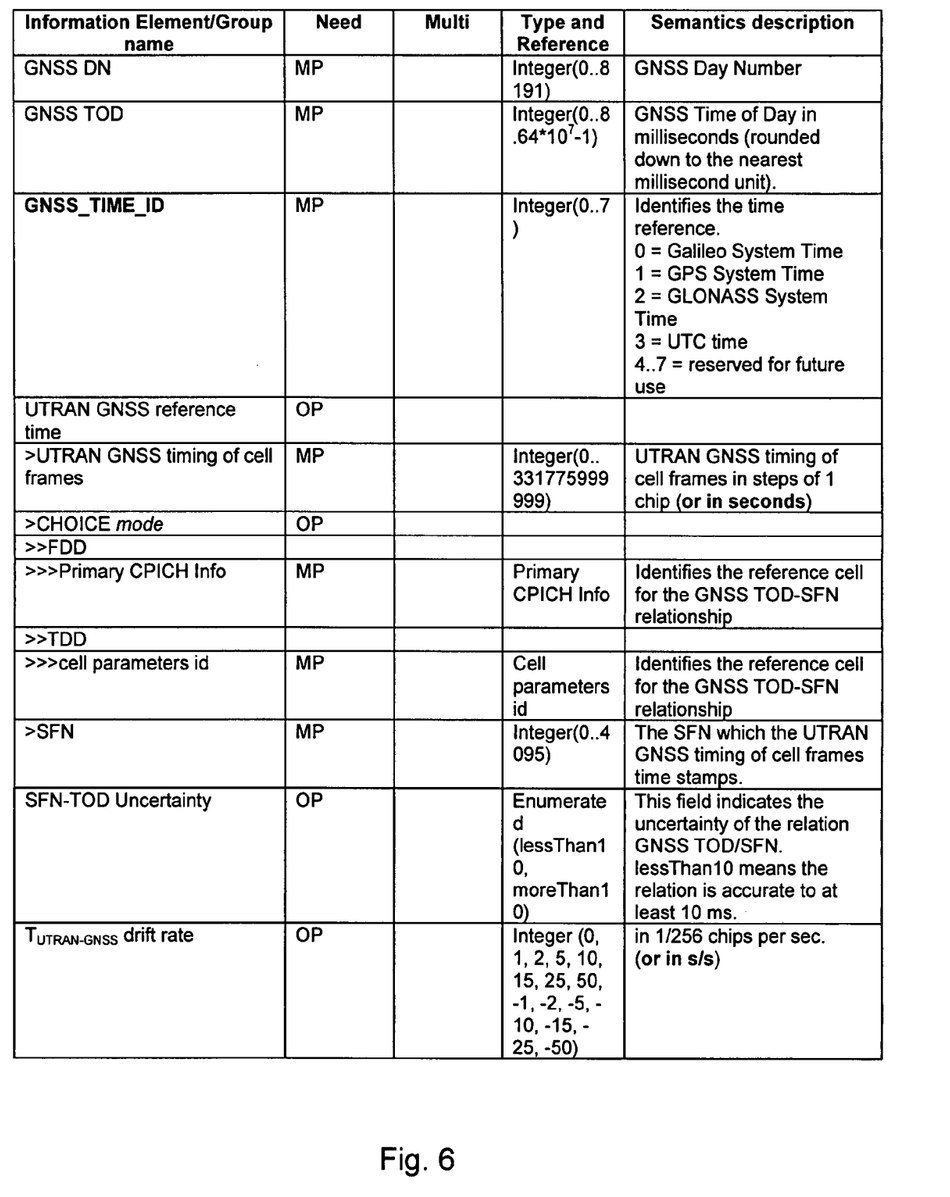
FIG. 6 is a table illustrating the insertion of a field for a reference time identifier in an assistance data message.

FIG. 6 is a table presenting exemplary defined parameters that may be selected for assembling a time assistance message or an information element for a more general message. It is to be understood that it may be enhanced with other assistance parameters. The depicted columns have the same headings as the columns of the table of FIG. 3.

One of the mandatory parameters is again a GNNS_TIME_ID parameter. The GNSS_TIME_ID parameter indicates a reference time ID defining which system time has been used as the reference for the assistance data. Each reference time ID is represented again by another integer value between zero and seven so that each integer value may be coded by three bits. The Galileo system time could be represented by a zero, the GPS time, including the time of a modernized GPS, could by represented by a one, the GLONASS time could by represented by a two and the UTC time could by represented by a three. The integer values four to seven could be reserved for future use, for example for the SBAS time and/or the QZSS time. Again, it is to be understood that in an alternative embodiment, the GNSS_TIME_ID parameter could also be an optional parameter.

While details of further parameters of the time assistance message can be taken again from the technical specification 3GPP TS 25.331, the interpretation of the other parameters has been adapted accordingly again.

Further parameters comprise for instance a 'GNSS DN' parameter, which indicates a GNSS Day Number in full days, and a 'GNSS TOD' parameter, which indicates the GNSS Time of Day in milliseconds rounded down to the nearest millisecond unit.

A further parameter for providing a UTRAN GNSS reference time is a 'UTRAN GNSS timing of cell frames' parameter. It indicates a UTRAN GNSS timing of cell frames in steps of 1 chip. Alternatively, it would be possible to indicate the 'UTRAN GNSS timing of cell frames' parameter in seconds rather than in UMTS chips. This implementation would be very generic as the same parameter could be used also for other communication systems than UMTS. In this case, the references to UTRAN in the table of FIG. 6 could also be replaced by a general reference to a 'communication system radio access network'.

A further parameter is the '$T_{UTRAN-GNSS}$ drift rate' parameter, which indicates the drift rate of the base station clock with respect to the time reference indicated by GNSS_TIME_ID in ¹⁄₂₅₆ chips per second. It is also possible to indicate the $T_{UTRAN-GNSS}$ drift rate in s/s instead, in order to ensure that it can be used for any communication system.

Mobile station 311 does not perform any positioning calculations by itself, but transmits the measurement results to server 320 (step 616).

In server 320, the processor 322 executing program code 326 receives the measurement results via interface 321 and performs positioning calculations for mobile station 311 (step 625) based on the measurement results and possibly on other information received for example from a connected local measurement unit (not shown).

For the positioning calculations, the processor 322 uses a suitable type of reference time. The reference time may correspond for instance to the system time of the GNSS used by mobile station 311 for the measurements.

The processor 322 further executes program code 327 to assemble the resulting location information in a location information message or in a location information element of a more comprehensive message. In addition to the actual location information, a reference time ID is included, which indicates the type of the reference time that was used in the positioning calculations. A location information element or location information message may comprise again for example the parameters presented in FIG. 3. The resulting message is transmitted via interface 323 to server 330 (step 626).

Server 330 receives any message including location information and a reference time ID and processes them for providing a desired service. Steps 631, 632 and 633, which are carried out at network server 330 to this end, correspond to steps 221, 222 and 223 described above with reference to FIG. 2. The processing may be the same for messages assembled by a mobile station 310 and for messages assembled by server 320.

It is to be understood that the presented assembling and forwarding functions could equally be realized by different or additional servers or by gateways.

Thus, the functions illustrated by the processor 322 executing program code 328 or 327, respectively, or a corresponding circuitry, can also be viewed as means for receiving or assembling a message including a reference time identifier; and as means for providing the message for transmission. Alternatively, they can be viewed as means for receiving or assembling a message including a reference time, wherein the reference time is indicated in seconds; and as means for providing the message for transmission.

The program codes 328 and 327 can also be viewed as comprising such means in the form of functional modules.

The functions illustrated by the processor 332 executing program code 335 or a corresponding circuitry can also be viewed as means for extracting from a received message a reference time identifier and additional information; while the processor 332 executing program code 336 or a corresponding circuitry can also be viewed as means for processing the additional information taking account of the reference time identifier. Alternatively, they can be viewed as means for extracting from a received message a reference time, wherein the reference time is indicated in seconds; and as means for processing the reference time taking account of the indication in seconds, respectively.

The program codes 335 and 336 can also be viewed as comprising such means in the form of functional modules.

It is to be understood that all described links in the above presented exemplary embodiments can be direct or indirect links.

The presented exemplary embodiments thus present assistance data that can be applied in any GNSS without requiring a redefinition of the time reference, specifically when it comes to the delivery of accurate time reference in RAN. The embodiments allow using any GNSS system time or even UTC time as the basis of the time assistance messages. This is a very beneficial feature as the SMLC cannot know in advance which satellites or satellite systems are available at the position of a mobile station. Further, it has been shown that the presented message structures can be used for any kind of communication system, not only for UMTS.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
    an apparatus receiving or assembling a message including an absolute reference time and a reference time identifier identifying a type of said reference time, said reference time identifier being selected from a plurality of defined reference time identifiers including identifiers for at least two global navigation satellite systems; and
    said apparatus providing said message for transmission.

2. The method according to claim 1, wherein said message further includes assistance data for a satellite based positioning, and wherein said reference time identifier identifies a type of a reference time used for said assistance data.

3. The method according to claim 1, wherein said messages further includes time relation information indicating the relation between a time of different systems, and wherein said reference time identifier identifies one of said systems.

4. The method according to claim 1, wherein said message further includes location information, which has been determined based on satellite signals, and wherein said reference time identifier identifies a type of a reference time used in determining said location information.

5. The method according to claim 1, wherein a reference time identifier is defined for at least one of:
    a Galileo positioning system;
    a global positioning system;
    a global orbiting navigation satellite system;
    a space based augmentation system;
    a quasi-zenith satellite system; and
    a coordinated universal time.

6. A computer program product in which a program code is stored in a computer readable medium, said program code realizing the method of claim 1 when executed by a processor.

7. An apparatus comprising a processor and a memory including computer program code, the memory and the computer program code configured to, with the processor, cause the apparatus at least to perform:
    receive or assemble a message including an absolute reference time and a reference time identifier identifying a type of said reference time, said reference time identifier being selected from a plurality of defined reference time identifiers including identifiers for at least two global navigation satellite systems; and
    provide a received or assembled message for transmission.

8. The apparatus according to claim 7, wherein said message further includes assistance data for a satellite based positioning, and wherein said reference time identifier identifies a type of a reference time used for said assistance data.

9. The apparatus according to claim 7, wherein said messages further includes time relation information indicating the relation between a time of different systems, and wherein said reference time identifier identifies one of said systems.

10. The apparatus according to claim 7, wherein said message further includes location information, which has been determined based on satellite signals, and wherein said reference time identifier identifies a type of a reference time used in determining said location information.

11. The apparatus according to claim 7, wherein said processing component is configured to select said reference time identifier from a dedicated reference time identifier defined for at least one of:
    a Galileo positioning system;
    a global positioning system;
    a global orbiting navigation satellite system;
    a space based augmentation system;
    a quasi-zenith satellite system; and
    a coordinated universal time.

12. The apparatus according to claim 7, further comprising at least one of:
    a global navigation satellite system receiver configured to receive said satellite signals;
    a communication component configured to enable a communication with another device to which said message is to be transmitted; and
    a communication component configured to enable a communication with device from which said message is to be received.

13. The apparatus according to claim 7, wherein said apparatus is one of a cellular terminal, a wireless local access network terminal, an accessory device, a network server, a gateway and a module for an electronic device.

14. An assembly comprising
    an electronic device with a global navigation satellite system receiver configured to receive satellite signals; and an electronic device configured to enable a transmission of a message to another device;

one of said electronic devices including an apparatus according to claim 7.

15. An apparatus comprising a processor and a memory including computer program code, the memory and the computer program code configured to, with the processor, cause the apparatus at least to perform:

extract from a received message an absolute reference time, a reference time identifier identifying a type of said reference time and additional information, said reference time identifier being one of a plurality of defined reference time identifiers including identifiers for at least two global navigation satellite systems; and process said additional information taking account of said reference time identifier.

16. The apparatus according to claim 15, further comprising:

an interface configured to enable a communication with another device for receiving said message.

17. The apparatus according to claim 15, wherein said apparatus is one of a cellular terminal, a wireless local access network terminal, an accessory device, a network server, a gateway and a module for an electronic device.

18. A method comprising:

an apparatus extracting from a received message an absolute reference time, a reference time identifier identifying a type of said reference time and additional information, said reference time identifier being one of a plurality of defined reference time identifiers including identifiers for at least two global navigation satellite systems; and said apparatus processing said additional information taking account of said reference time identifier.

19. A system comprising:

an apparatus according to claim 7; and an apparatus comprising a processor and a memory including computer program code, the memory and the computer program code configured to, with the processor, cause the apparatus at least to perform:

extract from a received message an absolute reference time, a reference time identifier identifying a type of said reference time and additional information, said reference time identifier being one of a plurality of defined reference time identifiers including identifiers for at least two global navigation satellite systems: and process said additional information taking account of said reference time identifier; and further comprising:

an interface configured to enable a communication with another device for receiving said message.

20. An apparatus comprising:

means for receiving or assembling a message including an absolute reference time and a reference time identifier identifying a type of said reference time, said reference time identifier being selected from a plurality of defined reference time identifiers including identifiers for at least two global navigation satellite systems; and means for providing said message for transmission.

21. A computer program product in which a program code is stored in a computer readable medium, said program code realizing the method of claim 18 when executed by a processor.

22. An apparatus comprising:

means for extracting from a received message an absolute reference time, a reference time identifier identifying a type of said reference time and additional information, said reference time identifier being one of a plurality of defined reference time identifiers including identifiers for at least two global navigation satellite systems; and means for processing said additional information taking account of said reference time identifier.

* * * * *